(12) United States Patent
Al-Ofi et al.

(10) Patent No.: US 12,529,312 B2
(45) Date of Patent: Jan. 20, 2026

(54) METHOD FOR CHARACTERIZING ORGANIC RICH ROCK MATURITY AND PRODUCIBILITY

(71) Applicant: Baker Hughes Oilfield Operations LLC, Houston, TX (US)

(72) Inventors: Salah Mohammed Al-Ofi, Khobar (SA); Amer Hanif, Tomball, TX (US); Elton Frost, Jr., Spring, TX (US); Frank Walles, Minneapolis, MN (US)

(73) Assignee: Baker Hughes Oilfield Operations LLC, Houston, TX (US)

(*) Notice: Subject to any disclaimer, the term of this patent is extended or adjusted under 35 U.S.C. 154(b) by 304 days.

(21) Appl. No.: 18/376,377

(22) Filed: Oct. 3, 2023

(65) Prior Publication Data
US 2025/0109687 A1   Apr. 3, 2025

(51) Int. Cl.
*E21B 49/08*   (2006.01)
*E21B 49/00*   (2006.01)
*G01N 24/08*   (2006.01)
*G01V 3/00*   (2006.01)

(52) U.S. Cl.
CPC .......... *E21B 49/088* (2013.01); *E21B 49/005* (2013.01); *G01N 24/081* (2013.01); *G01V 3/00* (2013.01)

(58) Field of Classification Search
CPC ... E21B 49/088; E21B 49/005; G01N 24/081; G01V 3/00
See application file for complete search history.

(56) References Cited

U.S. PATENT DOCUMENTS

| | | |
|---|---|---|
| 9,880,319 B2 | 1/2018 | Kadayam Viswanathan et al. |
| 10,386,529 B2 | 8/2019 | Misra et al. |
| 10,983,246 B2 | 4/2021 | Mosse et al. |
| 11,048,012 B2 | 6/2021 | Rasmus et al. |

(Continued)

OTHER PUBLICATIONS

Dabidian, Nima, et al., "Quantifying the Impact of Thermal Maturity on Dielectric Permittivity of Pure Kerogen in Organic-Rich Mudrocks", URTeC 2460670, Unconventional Resources Technology Conference, Aug. 2016, 1-11.

(Continued)

*Primary Examiner* — Ryan D Walsh
(74) *Attorney, Agent, or Firm* — Crowe & Dunlevy, P.C.

(57) ABSTRACT

Disclosed herein is a method for identification of zones of high producibility in shale reservoirs. The method includes obtaining a Total Organic Carbon (TOC) content and an organic sulfur content of a formation interval using geochemical measurements and determining a dielectric dispersion response of the formation interval using dielectric measurements. The dielectric dispersion response is processed to obtain a pore system tortuosity parameter. The pore system tortuosity parameter is correlated with a ratio of the organic sulfur content to the TOC content to identify presence of zones of mature kerogen with high or low hydrocarbon producibility, immature kerogen with a presence of clay, and on-productive or over-mature zones within the formation interval. This correlation is performed by comparing the ratio of the organic sulfur content to the TOC to an organic matter maturity threshold and comparing the pore system tortuosity parameter to a pore system tortuosity parameter threshold.

21 Claims, 4 Drawing Sheets

(56) References Cited

U.S. PATENT DOCUMENTS

| | | | |
|---|---|---|---|
| 11,340,375 | B2 | 5/2022 | Homan et al. |
| 11,352,879 | B2 | 6/2022 | Li et al. |
| 11,754,518 | B2 * | 9/2023 | Valori ................. G01V 3/38 324/303 |
| 2010/0228485 | A1 | 9/2010 | Betancourt et al. |
| 2013/0282288 | A1 * | 10/2013 | Quinn .................. G01V 3/32 702/7 |
| 2015/0081265 | A1 | 3/2015 | Kauerauf et al. |
| 2015/0284811 | A1 | 10/2015 | Knight et al. |
| 2015/0285944 | A1 * | 10/2015 | Herron ............... G01V 5/101 250/269.6 |
| 2016/0186556 | A1 | 6/2016 | Rasmus et al. |
| 2020/0408090 | A1 | 12/2020 | Kadayam Viswanathan et al. |
| 2021/0223192 | A1 * | 7/2021 | Heidari ............. G01R 33/448 |
| 2022/0397699 | A1 * | 12/2022 | Jin ..................... G01V 20/00 |

OTHER PUBLICATIONS

French, Katherine L., et al., "Trends in thermal maturity indicators for the organic sulfur-rich Eagle Ford Shale", Marine and Petroleum Geology, May 2020, 1-21.

Fu, Jian, et al., "A New Evaluation Method of Total Organic Carbon for Shale Source Rock Based on the Effective Medium Conductivity Theory", Hindawi Geofluids, Oct. 2021, 1-12.

Hizem Mehdi, et al., "Dielectric Dispersion: A New Wireline Petrophysical Measurement", SPE 116130, Society of Petroleum Engineers, Sep. 2008, 1-21.

Saidian Milad, et al., "Effect of clay and organic matter on nitrogen adsorption specific surface area and cation exchange capacity in shales (mudrocks)", Journal of Natural Gas Science and Engineering, Oct. 2015, 38 pp, manuscript only.

International Search Report and Written Opinion for PCT/US2024/048214 mailed Jan. 9, 2025.

\* cited by examiner

METHOD FOR CHARACTERIZING ORGANIC RICH ROCK MATURITY AND PRODUCIBILITY

TECHNICAL FIELD

This disclosure pertains to the field of reservoir evaluation. In particular, it describes a method for locating sweetspots and determining producibility of a given formation interval based on analysis of a combination of elemental and textural data about a reservoir.

BACKGROUND

The characteristics of a reservoir, such as an organic-rich source rock formation (e.g., shale gas or shale oil reservoir), including its total organic matter (TOC) and textures, are utilized not only in determining the availability, storage, and transport of hydrocarbons within the reservoir but also in the identification of "sweetspots" and the assessment of producibility. Producibility refers to the capacity of the reservoir to yield hydrocarbons in commercially viable quantities and at commercially viable rates, while sweetspots are regions within the reservoir exhibiting particularly advantageous conditions and properties for hydrocarbon extraction. It follows then that the identification of these regions, by virtue of their high producibility, can increase the efficiency of drilling operations.

Kerogen, which is a primary component of organic matter in such an organic-rich source rock formation, undergoes mineralogical changes over time, and its thermal maturity is particularly relevant to the yield potential of the reservoir interval in which it occurs and the determination of the location of sweetspots. Generally speaking, the more mature the kerogen, the more hydrocarbon it will produce. It is known that complex dielectric or conductivity measurements of an organic-rich source rock formation can be used to indirectly measure the thermal maturity of its kerogen. Therefore, there has been a concerted effort in the past to associate these dielectric or conductivity measurements with the thermal maturity of kerogen in order to locate sweetspots and determine producibility.

As examples of these prior efforts, Dabidian and Heidari (2016) [1] explored the correlation between thermal maturity and increasing values of the dielectric constant. They attributed the increasing values of the dielectric constant to the rising content of graphite, enhanced aromaticity, and shifts in kerogen wettability, which are all indicators of thermal maturity.

Misra et al. (2016) [2] introduced a technique aimed at the determination of the organic maturity of an organic-rich source rock formation. This technique utilized multifrequency complex conductivity, in particular the estimation of graphite and pyrite contents, and relied on kHz range variation of real and imaginary formation conductivity—a range influenced by electro-chemical polarization, thereby distinguishing it from the frequency range typically captured by current dielectric logging tools as underscored by Hazim et al. (2008) [3]. Indeed, in a broader context, conventional dielectric logging tools generally perform measurements at frequencies of between a few MHz and a few GHz, thereby capturing details such as interfacial polarization, which is the polarization of water molecules at the interface between the water and the rock and is largely governed by pore geometry, and molecular polarization, which is the polarization of the molecules in the rock and driven by water and mineral content.

Rasmus et al. (2021) [4] offered a method to estimate a kerogen maturity index, which is a quantitative measure of the thermal maturity of kerogen. This approach combined the dielectric constant value with a graphite to kerogen ratio derived from gamma-ray spectroscopy measurements.

The impact of kerogen thermal maturity on parameters like pore structure and matrix specific area, the surface area of the solid material in a per unit volume of rock, was also highlighted in work by Milad et al. (2016) [5].

The above-described prior art demonstrates the potential of using complex dielectric or conductivity measurements to indirectly measure the thermal maturity of kerogen. However, the techniques and methods described above still do not provide the level of detail and accuracy in the location of sweetspots and the determination of producibility. Therefore, further development is still needed.

SUMMARY

Disclosed herein is a method for identification of zones of high producibility in organic-rich source rock associated reservoirs. The method includes obtaining a Total Organic Carbon (TOC) content and an organic sulfur content of a formation interval using geochemical measurements, determining a dielectric dispersion response of the formation interval using dielectric measurements, and processing the dielectric dispersion response to obtain a pore system tortuosity parameter. The method further includes correlating the pore system tortuosity parameter with a ratio of the organic sulfur content to the TOC content to thereby identify presence of zones of mature kerogen with high or low hydrocarbon producibility, zones of immature kerogen with a presence of clay, and non-productive or over-mature zones within the formation interval by: comparing the ratio of the organic sulfur content to the TOC to an organic matter maturity threshold, and comparing the pore system tortuosity parameter to a pore system tortuosity parameter threshold.

The pore system tortuosity parameter may be correlated with the ratio of the organic sulfur content to the TOC content by determining: whether the ratio of the organic sulfur content to the TOC is greater than an organic matter maturity threshold and the pore system tortuosity parameter is greater than a pore system tortuosity parameter threshold, indicative of a zone of mature kerogen with high hydrocarbon producibility; whether the ratio of the organic sulfur content to the TOC is greater than the organic matter maturity threshold and the pore system tortuosity parameter is less than the pore system tortuosity parameter threshold, indicative of a zone of mature kerogen with low hydrocarbon producibility; whether the ratio is less than the organic matter maturity threshold and the pore system tortuosity parameter is greater than the pore system tortuosity parameter threshold, indicative of a zone of immature kerogen with a presence of clay; and whether the ratio is less than the organic matter maturity threshold and the pore system tortuosity parameter is less than the pore system tortuosity parameter threshold, indicative of a non-productive of over-mature kerogen zone.

The pore system tortuosity parameter may be obtained by processing the dielectric dispersion response to obtain a dielectric dispersion slope for the formation interval.

The dielectric dispersion response may be determined by measuring a first dielectric constant of the formation interval at first frequency at which a dielectric constant of the formation interval is dominated by interfacial polarization, and measuring a second dielectric constant of the formation interval at a second frequency at which a dielectric constant of the formation interval is dominated by dominated by dipolar polarization. Together with this, the dielectric dispersion response may be processed to obtain the dielectric dispersion slope by dividing a difference between the second dielectric constant and the first dielectric constant by a difference between the second frequency and the first frequency. Here, the first frequency may be on the order of kilohertz or megahertz, while the second frequency is on the order of gigahertz.

As an alternative, the dielectric dispersion response may be determined by measuring dielectric constants of the formation interval at multiple frequencies, and the dielectric dispersion slope may be extracted from the dielectric dispersion response as a nonlinear fitting exponent by utilizing a polynomial, logarithmic, or exponential function The pore system tortuosity parameter may be obtained by processing the dielectric dispersion response to obtain a pore tortuosity index for the formation interval. The pore tortuosity index may be obtained from the dielectric dispersion response using effective medium theory, which can be mathematically represented as:

$$\varepsilon_{\mathit{eff}} = \emptyset_w^{m^*} \varepsilon_w + (1 - \emptyset_w^{m^*})\varepsilon_m - \varepsilon_m h(s)$$

where m* represents the pore tortuosity index, $\varepsilon_m$ represents matrix permittivity of the formation interval, $\varepsilon_w$ represents water permittivity of the formation interval, $\emptyset_w$ represents water-filled porosity of the formation interval, s is the ratio $\varepsilon_m/(\varepsilon_w-\varepsilon_m)$, and h(s) is computed numerically.

The organic matter maturity threshold and the pore system tortuosity parameter threshold may be determined based upon performance of an artificial maturation process on cores from the formation interval.

The TOC of the formation interval may be obtained using pyrolysis, and the organic sulfur content of the formation interval may be obtained using pyrolysis, combustion analysis or isotope analysis.

Also disclosed herein is a system for identification of zones of high producibility in shale reservoirs, the system comprising a microprocessor cooperating with memory and a communication interface for receiving a Total Organic Carbon (TOC) content and an organic sulfur content of a formation interval obtained using geochemical measurements, receiving a dielectric dispersion response of the formation interval determined using dielectric measurements, and processing the dielectric dispersion response to obtain a pore system tortuosity parameter. The microprocessor may also cooperate the memory and the communication interface for correlating the pore system tortuosity parameter with a ratio of the organic sulfur content to the TOC content to thereby identify presence of zones of mature kerogen with high or low hydrocarbon producibility, zones of immature kerogen with a presence of clay, and on-productive or over-mature zones within the formation interval by: comparing the ratio of the organic sulfur content to the TOC to an organic matter maturity threshold, and comparing the pore system tortuosity parameter to a pore system tortuosity parameter threshold.

The microprocessor may correlate the pore system tortuosity parameter with the ratio of the organic sulfur content to the TOC content by determining: whether the ratio of the organic sulfur content to the TOC is greater than an organic matter maturity threshold and the pore system tortuosity parameter is greater than a pore system tortuosity parameter threshold, indicative of a zone of mature kerogen with high hydrocarbon producibility; whether the ratio of the organic sulfur content to the TOC is greater than the organic matter maturity threshold and the pore system tortuosity parameter is less than the pore system tortuosity parameter threshold, indicative of a zone of mature kerogen with low hydrocarbon producibility; whether the ratio is less than the organic matter maturity threshold and the pore system tortuosity parameter is greater than the pore system tortuosity parameter threshold, indicative of a zone of immature kerogen with a presence of clay; and whether the ratio is less than the organic matter maturity threshold and the pore system tortuosity parameter is less than the pore system tortuosity parameter threshold, indicative of a non-productive of over-mature kerogen zone.

The microprocessor may obtain the pore system tortuosity parameter by processing the dielectric dispersion response to obtain a dielectric dispersion slope for the formation interval.

The microprocessor may obtain the pore system tortuosity parameter by processing the dielectric dispersion response to obtain a pore tortuosity index for the formation interval.

The microprocessor may obtain the pore tortuosity index from the dielectric dispersion response using effective medium theory, which may be mathematically represented as:

$$\varepsilon_{\mathit{eff}} = \emptyset_w^{m^*} \varepsilon_w + (1 - \emptyset_w^{m^*})\varepsilon_m - \varepsilon_m h(s)$$

where m* represents the pore tortuosity index, $\varepsilon_m$ represents matrix permittivity of the formation interval, $\varepsilon_w$ represents water permittivity of the formation interval, $\emptyset w$ represents water-filled porosity of the formation interval, s is the ratio $\varepsilon_m/(\varepsilon_w-\varepsilon_m)$, and h(s) is computed numerically.

DETAILED DESCRIPTION

The following disclosure enables a person skilled in the art to make and use the subject matter described herein. The general principles outlined in this disclosure can be applied to embodiments and applications other than those detailed above without departing from the spirit and scope of this disclosure. It is not intended to limit this disclosure to the embodiments shown, but to accord it the widest scope consistent with the principles and features disclosed or suggested herein.

A. GENERAL DESCRIPTION

As explained, the identification of sweetspots and determination of producibility in reservoir intervals hinges on understanding the organic content and texture therein, which influence optimal drilling methods and hydrocarbon storage and transport. Recognizing this, disclosed herein is a method and workflow providing for the evaluation of sweetspots and producibility within an organic-rich source rock formation (e.g., a shale gas or shale oil reservoir) based on the integration of elemental and textural data respectively obtained from geochemical and dielectric measurements performed on rock (either in-situ or in a laboratory).

In greater detail, the method and workflow include the determination of carbon and sulfur content within a reservoir from geochemical measurements, and the textural characterization of rock forming the reservoir via dielectric measurements. This elemental and textural data is then used within a mathematical algorithm and data transformation that produces a log based on set parameters. These logs offer insights into the sweetspots and producibility potential within the organic-rich source rock formation. Utilizing this data, informed decisions regarding drilling, production, and extraction can be made.

B. IN-DEPTH DESCRIPTION

Figure 1:
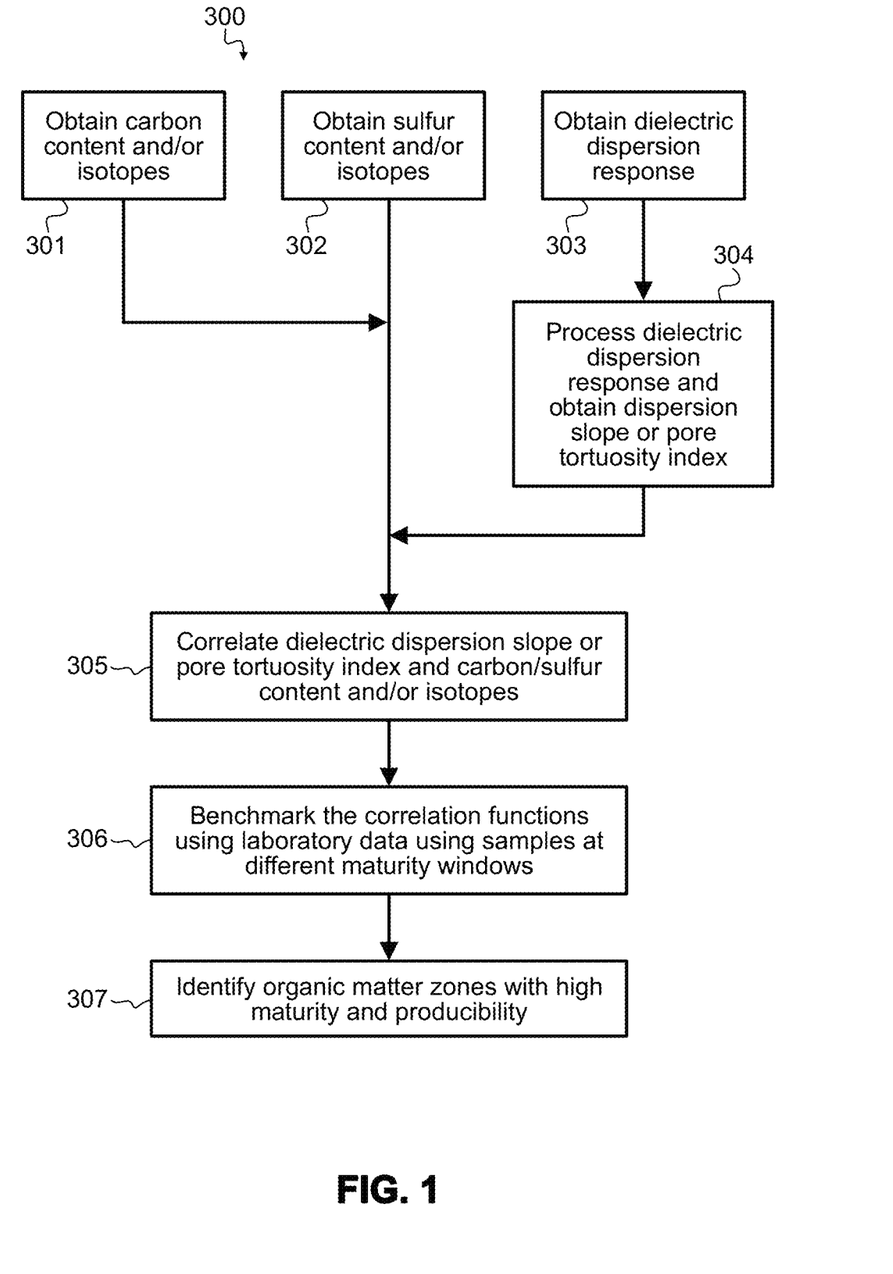
FIG. 1 is a flowchart of steps for performing a method disclosed herein for the identification of sweetspots and the determination of producibility in organic-rich source rock formations (e.g., shale gas or shale oil reservoirs) from organic content and texture obtained using geochemical and dielectric measurements.

The disclosed method and workflow for the identification of sweetspots and producibility in reservoir intervals from the organic content and texture information determined using geochemical and dielectric measurements is now described with reference to flowchart 300 of FIG. 1.

Organic-rich source rock formations, including shale gas and shale oil reservoirs, are accumulations of fine-grained sedimentary rocks and are common sources of hydrocarbons to be extracted. One aspect of an organic-rich source rock formation of interest is its total organic carbon (TOC), which is a measure of the quantity of carbon contained within organic compounds in a given rock sample. This measurement indicates the richness of organic matter in the rock, effectively informing how much hydrocarbon the rock might contain. Kerogen is a complex organic material present in these rocks, and when subjected to the proper conditions (e.g., adequate heat and pressure over geologic time) is converted to oil and/or gas. Therefore, as a primary source of petroleum, knowing the composition and amount of kerogen would help determine if an organic-rich source rock formation is viable for oil or gas extraction.

Another aspect of interest when evaluating an organic-rich source rock formation is its organic sulfur content, which provides insight into the sulfur present within the organic molecules of a given rock sample or reservoir interval. The amount and type of organic sulfur is indicative of the thermal maturity of the organic matter in the organic-rich source rock formation. Thermal maturity is a measure indicative of how much heat and pressure the organic materials in a rock have been subjected to over geological time. This is of interest because it reveals the stage of evolution of the organic matter toward becoming oil or gas. Essentially, the thermal maturity of the organic-rich source rock formation is suggestive of whether the organic-rich source rock formation is likely to produce oil, gas, or both, and what the efficiency of that production might be. In greater detail, a high thermal maturity typically indicates the presence of gas or oil, while an intermediate thermal maturity indicates the presence of oil, and a low thermal maturity suggests a lack of oil/gas or potential difficulty in extracting the hydrocarbons present.

Therefore, pursuant to the workflow described herein, TOC and organic sulfur content of a formation interval of interest are measured using geochemical measurements (Blocks 301, 302) performed either in-situ or in a laboratory environment on collected core samples. For example, TOC may be determined using pyrolysis, where rock samples are heated to release carbon, the amount of which indicates the richness of organic material. Organic sulfur content may be determined by combusting the rock to convert its sulfur-to-sulfur dioxide (SO2) for measurement, or by using isotope analysis to measure the relative abundance of different sulfur isotopes from core analysis, drill cuttings, or information derived from mud returns such as collected gas analysis. Note that any suitable in-situ or laboratory based geochemical measurement techniques may be used and that the above examples are not intended to be limiting.

In addition, the physical structure and physical characteristics of the organic-rich source rock formation are also of interest. Dielectric measurements, taken in-situ or in a laboratory environment, are used to examine how material in the formation interval interacts with an electric field, and are used in measuring the water-filled porosity of rock, or how much of the volume of the rock is made up of pores containing water. This is of interest because the porosity gives an idea of the potential space available for hydrocarbon storage. Additionally, such dielectric measurements may provide information about the pore/grain geometrical properties (e.g., the size, shape, and arrangement of the pores and solid particles of the rock). This is of interest because these properties can influence not only how much hydrocarbon the rock can store but also how easily these hydrocarbons can move through the rock, influencing both storage and producibility.

These dielectric measurements, which assess a material's response to an electric field, yield a value known as the dielectric constant. This constant reflects the ability of the investigated rock to store electrical energy. In the context of rocks (and particularly organic-rich source rock formations), the dielectric constant varies across different frequency ranges and is influenced by various factors depending on the frequency range.

Indeed, at frequencies on the order of kHz and MHz, the dielectric constant is dominated by interfacial polarization. This phenomenon is caused by the interfaces or boundaries within the texture of the rock, such as those between grains or the pores. Therefore, dielectric measurements at these frequencies can provide insights about the textural characteristics of the rock and the nature of its interfaces. Conversely, at frequencies on the order of GHz, the dielectric constant is dominated by dipolar polarization. This stems from the volumetric contributions of solid minerals and fluid (e.g., water and hydrocarbons) within the pores. Essentially, the molecules in these materials reorient in response to an external electric field, leading to this dipolar effect.

Another aspect of interest in dielectric data is the "dispersion effect," which describes the phenomenon where the dielectric constant of a material changes across different frequencies. The larger the difference between the dielectric constant values at kHz/MHz frequencies and GHz frequencies, the more intricate the rock's texture and geometry are. This complexity may arise from the rock's original sedimentary formation process or from the maturation of the kerogen within the organic-rich source rock formation. As kerogen evolves, it can create intra-kerogen porosity (e.g., pores within the kerogen that can contain hydrocarbons), influencing the rock's overall textural properties.

In accordance with the workflow described herein, the dielectric dispersion response (the manifestation or measurement of the dielectric dispersion effect) of the formation interval of interest is then obtained (Block 303). This response is processed to derive a dispersion slope or pore tortuosity index (Block 304).

The dispersion slope is now considered. This calculation is performed by calculating the slope of dielectric constant at two different frequencies (f); one in MHz range ($\varepsilon_{MHz}$) and another in GHz range ($\varepsilon_{GHz}$) as follows:

$$\gamma = \left| \frac{\varepsilon_{GHz} - \varepsilon_{MHz}}{f_{GHz} - f_{MHz}} \right| \quad (1)$$

This calculation of the dispersion slope, as represented by equation (1), quantifies the difference in the dielectric constants between these two frequency ranges. The slope $\gamma$ represents the rate of change of the dielectric constant with respect to the change in frequency. This slope could be extracted from two frequencies as linear line as in Eq. 1, or from multiple frequencies as a nonlinear fitting exponent by utilizing a function such as a polynomial, logarithmic or exponential function.

As an alternative, dielectric constant dispersion can be evaluated using real dielectric constant values at different frequencies, and from this, pore system tortuosity can be determined. Tortuosity is a measure of the complexity of the pathways through which fluids travel in a porous medium. A more tortuous pore system implies that the path a fluid particle would take is more convoluted than a straight-line distance between two points. Therefore, understanding the pore system tortuosity is of interest because it provides insight into the connectivity and shape of the pores in the medium. To quantitatively define theses pore characteristics, effective medium theory, as described in Strouds et al. 1986 [6], is applied for example as follows:

$$\varepsilon_{eff} = \emptyset_w^{m^*} \varepsilon_w + (1 - \emptyset_w^{m^*})\varepsilon_m - \varepsilon_m h(s) \quad (2)$$

where m* represents the tortuosity index, serving as a quantifiable measure of how winding the pore pathways are, $\varepsilon_m$ is the matrix permittivity, $\varepsilon_w$ is the water permittivity, and $\emptyset_w$ is the water-filled porosity. The term s is the ratio $\varepsilon_m/(\varepsilon_w-\varepsilon_m)$ and the function h(s) can be computed numerically as from Strouds et al. [6].

The dielectric dispersion slope $\gamma$ or the pore tortuosity index m* is then correlated with TOC and organic sulfur content (Block 305). The higher the slope $\gamma$ or tortuosity index m*, the more microfractures and intraparticle porosity generated during kerogen maturation process—essentially, as kerogen undergoes thermal maturation over geologic time, it evolves, leading to the development of microfractures and pores within the particles. Therefore, a higher value of $\gamma$ or m* may indicate a more complex internal structure of the rock with increased microfractures and pores.

Figure 2:
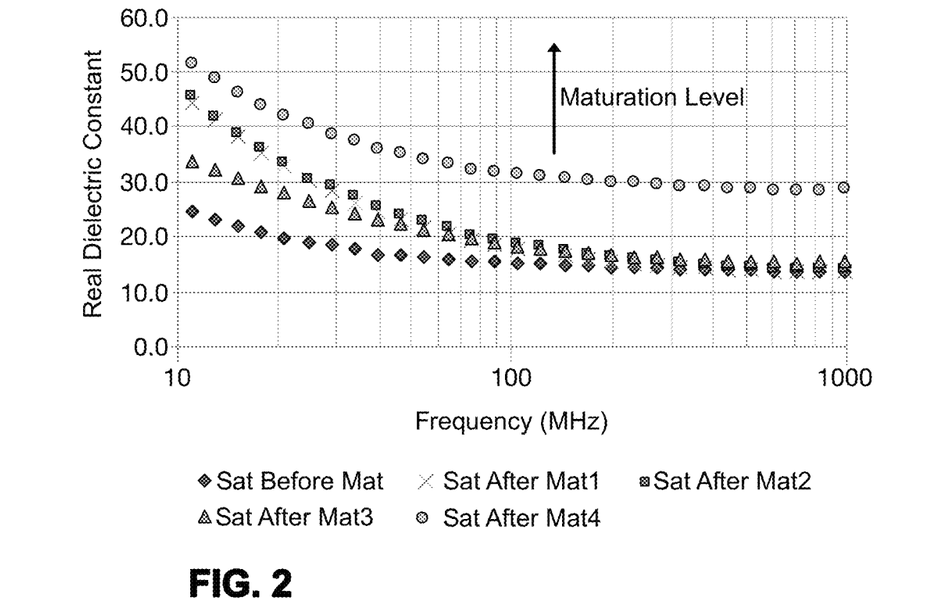
FIG. 2 is a graph showing the relationship between dielectric constant and frequency, as well as kerogen maturity level, in a reservoir interval evaluated using a dielectric tool.

This dielectric data, when paired with the organic sulfur to carbon ratio (known as the $\beta$ ratio), becomes an effective predictor of hydrocarbon producibility at specific depths or formation intervals of interest within a reservoir. See FIG. 2, showing how the dielectric constant slope varies throughout an artificial maturation process conducted in a laboratory on core samples from a desired reservoir interval—the dielectric constant asymptotically decreases with frequency while increasing as maturity increases.

In order to facilitate the identification of sweetspots with high producibility, certain thresholds are first defined. In particular, a threshold $\gamma$ of the dielectric dispersion slope (or a threshold $m_c$ of the tortuosity index) and a threshold value $\beta_c$ of organic matter maturity can be defined based on data obtained in the laboratory from the core samples from the desired reservoir interval, or from drill cuttings. These thresholds $\gamma_c$, $m_c$, $\beta_c$ may be determined through an analysis of the progression of thermal maturity and pore system tortuosity of immature, organic-rich samples subjected to an artificial maturation process in the laboratory. To accomplish this, pyrolysis is employed for tracking the progression of thermal maturity while the variations in pore system tortuosity are concurrently monitored using dielectric dispersion measurement. As the organic material in these samples matures, kerogen—a primary organic component in sedimentary rocks—undergoes transformations. When subjected to sufficiently high temperatures, kerogen starts to crack, leading to observable shifts in water-filled porosity, and the threshold values for may be set once cracking occurs. This observable shift in water-filled porosity can be identified through laboratory conducted dielectric or nuclear magnetic resonance (NMR) measurements, for example. An occurrence of dielectric constant change at high frequency, in the GHz range, during the artificial maturation process can be used to set pore system tortuosity threshold values, $\gamma_c$ or $m_c$. To derive reliable and representative threshold values, this artificial maturation and measurement exercise may be repeated across multiple core samples from the same or different reservoir intervals.

Figure 3:
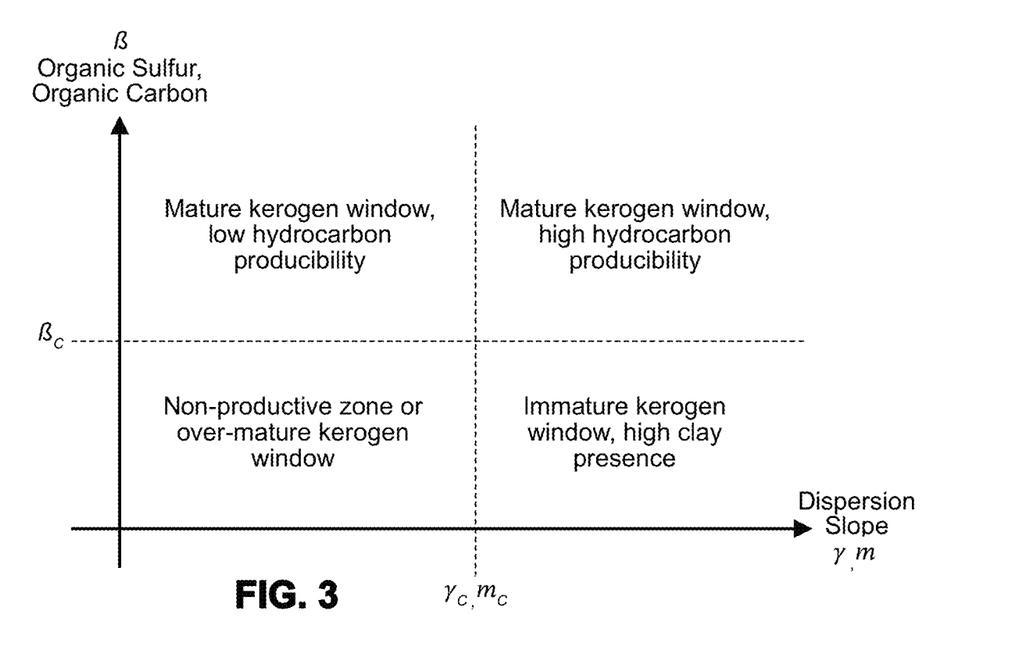
FIG. 3 is a diagrammatical representation of the correlation function described herein.

The thresholds $\gamma_c$, $m_c$, $B\beta_c$, may be used to arrange a correlation to apply to the collected dielectric and geochemical data to facilitate the identification of organic matter zones with high maturity and producibility (Block 306). As shown in FIG. 3, a systematic approach is used to deduce the maturity of kerogen and the potential producibility within a formation interval. In particular:

Presence of Mature Kerogen: If the geochemical data from the formation interval of interest reveals that the organic sulfur to organic carbon ratio $\beta$ exceeds the threshold value $\beta_c$ of organic matter maturity, it can be inferred that the interval contains mature kerogen. Within this mature kerogen interval, if the determined dispersion slope exceeds either the threshold $\gamma_c$ of the dielectric slope or the threshold $m_c$ of the tortuosity index, it can be inferred that the interval has a high hydrocarbon producibility. Conversely, if the dispersion slope does not exceed either the threshold $\gamma_c$ of the dielectric slope or the threshold $m_c$ of the tortuosity index, it can be inferred that the formation interval is likely to have lower hydrocarbon producibility (Block 307).

Presence of Immature Kerogen or Clay: For intervals where geochemical data suggests that the organic sulfur to organic carbon ratio $\beta$ does not exceed the $\beta_c$ threshold, and the dispersion slope exceeds either $\gamma_c$ or $m_c$, it can be inferred that the interval likely includes immature kerogen and has a high amount of clay.

Non-productive or Over-Mature Zones: If the organic sulfur to carbon ratio $\beta$ does not exceed the $\beta_c$ threshold and the dispersion slope does not exceed the $\gamma_c$ or $m_c$ thresholds, such intervals can be inferred to likely be non-productive.

Such intervals may indicate tight formations or the presence of over-mature kerogen, which once had hydrocarbons but those hydrocarbons have since been displaced.

This correlation approach can be summed as follows:
1. Mature kerogen window with high hydrocarbon producibility; $\beta > \beta_c$ & m, $\gamma > m_c$, $\gamma_c$
2. Mature kerogen window with low hydrocarbon producibility; $\beta > \beta_c$ & m, $\gamma < m_c$, $\gamma_c$
3. Immature kerogen window or presence of clay; $\beta < \beta_c$ & m, $\gamma > m_c$, $\gamma_c$
4. Non-productive zone or over-mature kerogen window with displaced hydrocarbon $\beta < \beta_c$ & m, $\gamma < m_c$, $\gamma_c$ The correlation functions may be calibrated against controlled laboratory data using core samples collected at different maturity windows. This benchmarking may start by selecting samples that represent substantially the entire spectrum of maturity levels, from immature kerogens to post-matured ones. Each sample can be suitably documented with respect to its source, geological history, and prior analysis results. Subjecting these samples to a series of standardized laboratory tests provides data on their organic content, structural characteristics, and hydrocarbon potential. Upon collecting this dataset, the correlation functions are then performed. The outputs from these functions are then cross-referenced with the known attributes of the samples. This process provides that the correlation functions are tuned correctly and highlights any discrepancies or areas of improvement. (Block 306)

Utilizing the correlation approach to determine sweetspots and zones of high producibility (e.g., formation intervals falling within a mature kerogen window region with high producibility, the conditions for which are shown as #1 above), operators are able to plan more efficient operations. For example, the results of the correlation may be utilized to determine where to drill, where to place lateral or offset wells, where to place completions, and where to frac.

The correlation provided by the workflow described above allows operators to pinpoint sweetspots and areas of high producibility, particularly in formation intervals within a mature kerogen window exhibiting high producibility (as delineated in condition #1), and utilize the knowledge to enhance the efficiency and precision of their production operations. For example, the results of the workflow may provide information about the optimal sites for drilling, providing for substantially maximized resource extraction with substantially minimized waste. Furthermore, the information from such results may direct the placement of lateral or offset wells, enabling operators to exploit pockets of rich hydrocarbon deposits that might otherwise be overlooked. Still further, when it comes to completions, the results of the workflow offer guidance on placement to provide for effective hydrocarbon recovery. Additionally, when it comes to hydraulic fracturing, understanding the location of the sweetspots and zones of high producibility is of particular use, allowing for targeted fracking operations that high production rates.

As an example, following the identification of sweetspots and zones of high producibility using the correlation technique, the following steps can be taken. Initially, drilling is undertaken at sites, identified through the correlation, offering the most promising reserves (e.g., sweetspots with high producibility), providing for extraction yielding high output. Once this initial drilling is established, the knowledge acquired about the producible zones and sweetspots aids in the placement of lateral or offset wells to help tap into additional resource pockets adjacent to the primary drilling site, enhancing the overall reservoir yield. As the drilling process evolves, the correlation data also aids in determining the efficient placements for completions, providing for each wellbore to be optimally positioned to facilitate the flow of hydrocarbons. Lastly, when considering hydraulic fracturing, the insights gained from the correlation technique are helpful—by understanding the zones of high producibility and identifying sweetspots, fracturing operations can be specifically targeted, leading to effective fractures, reduced operational risks, and an overall enhancement in hydrocarbon production. Thus, utilizing the correlation technique described above, operators can substantially increase and enhance production operations.

C. HARDWARE DESCRIPTION

Now described are dielectric logging tools such as may be used to make the measurements described above, with it being understood that computing hardware at the surface of a wellsite may be used to perform the workflow described above utilizing the data obtained by the dielectric logging tools.

Figure 4:
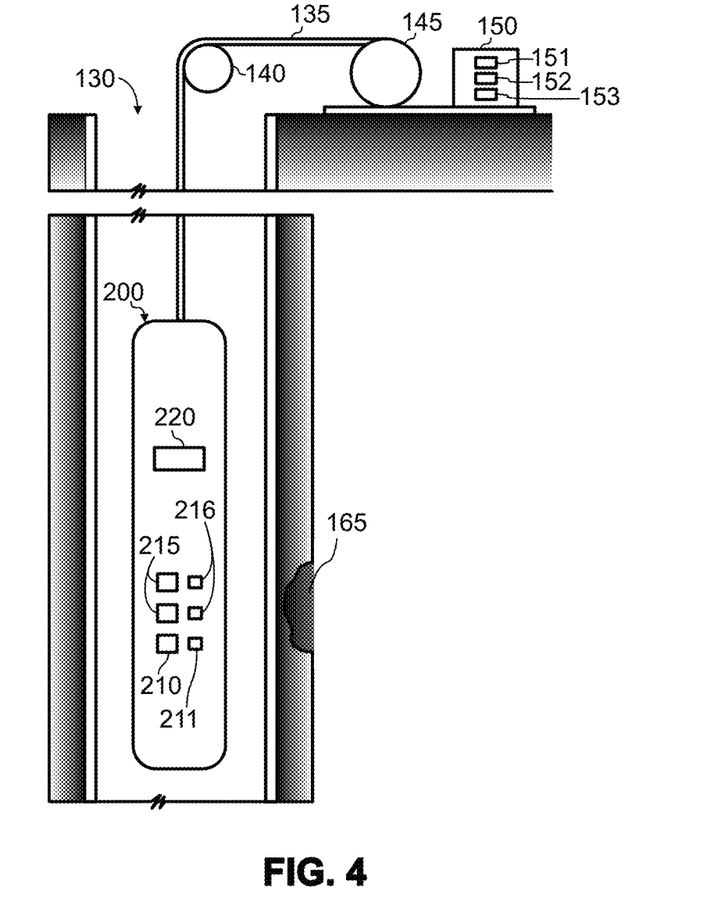
FIG. 4 is a first example embodiment of a multi-frequency dielectric well logging tool such as may be used to collect dielectric data used in performing the method disclosed herein.

Shown in FIG. 4 is a first exemplary multi-frequency dielectric well logging apparatus 200. The apparatus 200 is lowered into a borehole 130 by a wireline 135 that extends from the surface. To guide the wireline towards the wireline spool 145 for retrieval, a sheave 140 is used to redirect its path as it exits the borehole. Surface equipment 150 controls the lowering and raising action of the wireline 135.

The multi-frequency dielectric well logging apparatus 200 includes a transmitter 210, an antenna 211 associated with the transmitter 210, and multiple receivers 215 each having an associated antenna 216 being spaced at a different distance from the antenna 211 of the transmitter 210. The transmitter 210 drives its antenna 211 to generate electromagnetic (EM) waves at multiple frequencies, typically ranging from a few MHz to few GHz, which are directed into the surrounding formation. The choice of frequencies depends on the desired depth of investigation, as lower frequencies penetrate deeper into the formation, while higher frequencies provide higher resolution but shallower measurements. The EM waves propagate through the formation fluids and rock matrix in a subterranean region 165, and as the EM waves travel through the rock matrix and fluids, they experience changes in amplitude and phase due to the formation's dielectric properties. These properties are influenced by factors such as fluid content, rock mineral composition, and pore structure. The dielectric constant (permittivity) and conductivity of the formation affect the velocity and attenuation of the EM waves, respectively. The receivers 215 use their antenna 216 to detect the EM waves as they return. The transmitter 210 and receivers 215 operate under control of the processing circuit 220, which receives the measured data from the receivers 215 and analyzes the amplitude and phase differences between the transmitted and received signals at multiple frequencies. Inversion techniques are used by the processing circuit 220 to estimate the formation's dielectric properties from the measured data. This processed data is then transmitted uphole through the wireline 135 to the surface equipment 150 for further interpretation and determination of desired properties, alone or in conjunction with the NMR T2 data, such as the residual water saturation $S_{wr}$ and residual oil saturation $S_{or}$. The surface equipment 150 includes a microprocessor 151 in cooperation with memory 152 and a communication interface 153 to perform the determination of the desired properties, as well as potentially any of the other computing based tasks described herein.

Figure 5:
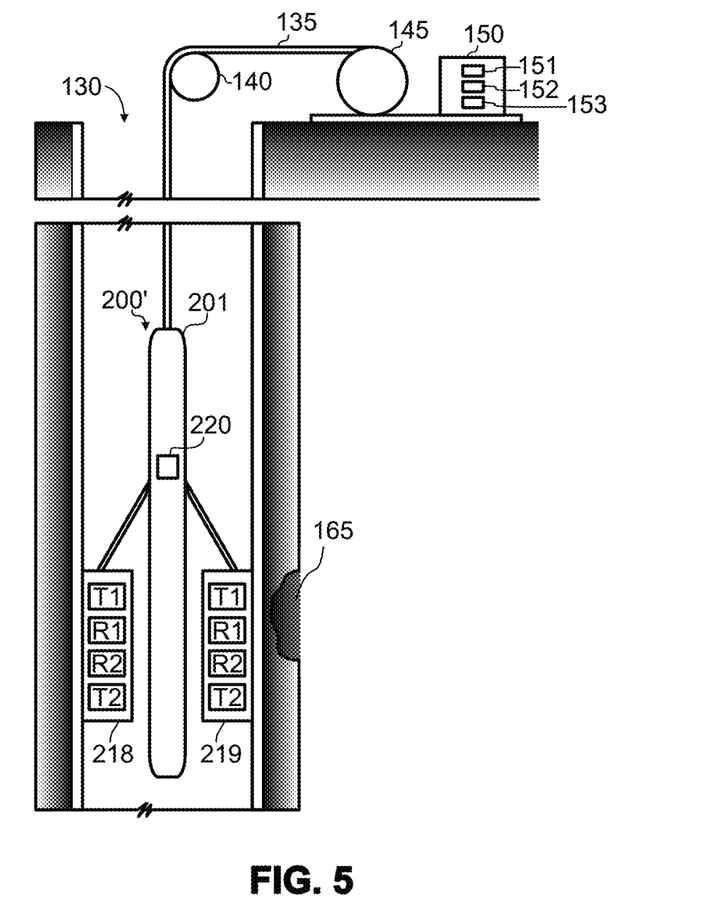
FIG. 5 is a second example embodiment of a multi-frequency dielectric well logging tool such as may be used to collect dielectric data used in performing the method disclosed herein.

Shown in FIG. 5 is a second exemplary multi-frequency dielectric well logging apparatus 200. The apparatus 200 is lowered into a borehole 130 by a wireline 135 that extends from the surface. To guide the wireline towards the wireline spool 145 for retrieval, a sheave 140 is used to redirect its path as it exits the borehole. Surface equipment 150 controls the lowering and raising action of the wireline 135.

The multi-frequency dielectric well logging apparatus 200 includes a main body 201 from which pad extension arms cause first and second pads 218 and 219 to engage the borehole 130 and make electrical contact therewith. Each pad 218 and 219 carries multiple transmitter circuits T1, T2 and multiple receiver circuits R1, R2. Each transmitter circuit T1, T2 has its own antenna or coil associated therewith and each receiver circuit R1, R2 has its own antenna or coil associated therewith.

The transmitters T1, T2 within the pads 218 and 219 drive their antennas to generate electromagnetic (EM) waves at multiple frequencies. These EM waves are transmitted into the formation fluids and rock matrix in a subterranean region 165 by direct contact with the borehole wall, ensuring a strong coupling and accurate measurements. The receivers R1, R2 within the pads 218 and 219 use their antennas to detect the EM waves as they return after interacting with the formation.

The transmitters T1, T2 and receivers R1, R2 within the pads 218 and 219 operate under control of the processing circuit 220, which receives the measured data from the receivers R1, R2 and analyzes the amplitude and phase differences between the transmitted and received signals at multiple frequencies. Inversion techniques are used by the processing circuit 220 to estimate the formation's dielectric properties from the measured data. This processed data is then transmitted uphole through the wireline 135 to the surface equipment 150 for further interpretation and determination of desired properties, alone or in conjunction with the NMR T2 data, such as the residual water saturation $S_{wr}$ and residual oil saturation $S_{or}$. The surface equipment 150 includes a microprocessor 151 in cooperation with memory 152 and a communication interface 15 to perform the determination of the desired properties, as well as potentially any of the other computing based tasks described herein.

Different designs of multi-frequency dielectric tools may be used to perform these measurements. Indeed, any suitable multi-frequency dielectric tool may be used, regardless of whether conveyed via the wireline 135 or as part of a drill string.

D. CITATIONS

[1] Dabidian, N., Heidari, Z., and Yang*, A. 2016. Quantifying the Impact of Thermal Maturity on Dielectric Permittivity of Pure Kerogen in Organic-Rich Mudrocks. Presented at the Unconventional Resources Technology Conference (URTeC), San Antonio, Texas, 1-3 August. URTeC 2460670.

[2] Misra et al., 2019. Subsurface Estimation of Level of Organic Maturity. U.S. Pat. No. 10,386,529.

[3] Hizem, M., Budan, H., Devillé, B., Faivre, O., Mossé, L., and Simon, M., 2008, Dielectric dispersion: A new wireline petrophysical measurement: paper SPE 116130, presented at the SPE Annual Technical Conference and Exhibition, Denver, Colorado, USA, 21-24 September.

[4] Rasmus et al., 2021. Formation characterization system. U.S. Pat. No. 11,048,012.

[5] Milad Saidian, Lemuel J. Godinez, Manika Prasad, 2016. Effect of clay and organic matter on nitrogen adsorption specific surface area and cation exchange capacity in shales (mudrocks), Journal of Natural Gas Science and Engineering, Volume 33, Pages 1095-1106.

[6] Stroud, D., Milton, G. and De, D., 1986. Analytical Model for Dielectric Response of Brine-Saturated Rocks. Physical Review B 34 (8), 5145-5153. DOI: 10.1103/PhysRevB.34.5145.

[7] French, K. L., Birdwell, J. E., & Lewan, M. D. (2020). Trends in thermal maturity indicators for the organic sulfur-rich Eagle Ford Shale. Marine and Petroleum Geology, 118, 104459.

[8] Mosse et al., 2021. Thermal Maturity Estimation via Logs. U.S. Pat. No. 10,983,246.

Finally, it is evident that modifications and variations can be made to what has been described and illustrated herein without departing from the scope of this disclosure.

Although this disclosure has been described with a limited number of embodiments, those skilled in the art, having the benefit of this disclosure, can envision other embodiments that do not deviate from the disclosed scope. Furthermore, skilled persons can envision embodiments that represent various combinations of the embodiments disclosed herein made in various ways.

The invention claimed is:

1. A method for identification of zones of high producibility in organic-rich source rock associated reservoirs, the method comprising:
obtaining a Total Organic Carbon (TOC) content and an organic sulfur content of a formation interval using geochemical measurements;
determining a dielectric dispersion response of the formation interval using dielectric measurements;
processing the dielectric dispersion response to obtain a pore system tortuosity parameter; and
correlating the pore system tortuosity parameter with a ratio of the organic sulfur content to the TOC content to thereby identify presence of zones of mature kerogen with high or low hydrocarbon producibility, zones of immature kerogen with a presence of clay, and non-productive or over-mature zones within the formation interval by: comparing the ratio of the organic sulfur content to the TOC to an organic matter maturity threshold, and comparing the pore system tortuosity parameter to a pore system tortuosity parameter threshold.

2. The method of claim 1, wherein
the pore system tortuosity parameter is correlated with the ratio of the organic sulfur content to the TOC content by determining whether:
the ratio of the organic sulfur content to the TOC is greater than an organic matter maturity threshold and the pore system tortuosity parameter is greater than a pore system tortuosity parameter threshold, indicative of a zone of mature kerogen with high hydrocarbon producibility;
the ratio of the organic sulfur content to the TOC is greater than the organic matter maturity threshold and the pore system tortuosity parameter is less than the pore system tortuosity parameter threshold, indicative of a zone of mature kerogen with low hydrocarbon producibility;
the ratio is less than the organic matter maturity threshold and the pore system tortuosity parameter is greater than the pore system tortuosity parameter threshold, indicative of a zone of immature kerogen with a presence of clay; and the ratio is less than the organic matter maturity threshold and the pore system tortuosity parameter is less than the pore system tortuosity parameter threshold, indicative of a non-productive of over-mature kerogen zone.

3. The method of claim 1, wherein the pore system tortuosity parameter is obtained by processing the dielectric dispersion response to obtain a dielectric dispersion slope for the formation interval.

4. The method of claim 3,
wherein the dielectric dispersion response is determined by measuring a first dielectric constant of the formation interval at first frequency at which a dielectric constant of the formation interval is dominated by interfacial polarization, and measuring a second dielectric constant of the formation interval at a second frequency at which a dielectric constant of the formation interval is dominated by dominated by dipolar polarization; and
wherein the dielectric dispersion response is processed to obtain the dielectric dispersion slope by dividing a difference between the second dielectric constant and the first dielectric constant by a difference between the second frequency and the first frequency.

5. The method of claim 4, wherein the first frequency is on the order of kilohertz or megahertz, and wherein the second frequency is on the order of gigahertz.

6. The method of claim 3,
wherein the dielectric dispersion response is determined by measuring dielectric constants of the formation interval at multiple frequencies; and
wherein the dielectric dispersion slope is extracted from the dielectric dispersion response as a nonlinear fitting exponent by utilizing a polynomial, logarithmic, or exponential function.

7. The method of claim 1, wherein the pore system tortuosity parameter is obtained by processing the dielectric dispersion response to obtain a pore tortuosity index for the formation interval.

8. The method of claim 7, wherein the pore tortuosity index is obtained from the dielectric dispersion response using effective medium theory.

9. The method of claim 8, wherein the effective medium theory is mathematically represented as:

$$\varepsilon_{\textit{eff}} = \varnothing_w^{m^*} \varepsilon_w + (1 - \varnothing_w^{m^*}) \varepsilon_m - \varepsilon_m h(s)$$

where m* represents the pore tortuosity index, $\varepsilon_m$ represents matrix permittivity of the formation interval, $\varepsilon_w$ represents water permittivity of the formation interval, $\varnothing_w$ represents water-filled porosity of the formation interval, s is the ratio $\varepsilon_m/(\varepsilon_w - \varepsilon_m)$, and h(s) is computed numerically.

10. The method of claim 1, wherein the organic matter maturity threshold and the pore system tortuosity parameter threshold are determined based upon performance of an artificial maturation process on cores from the formation interval.

11. The method of claim 1, wherein the TOC of the formation interval is obtained using pyrolysis, and wherein the organic sulfur content of the formation interval is obtained using pyrolysis, combustion analysis or isotope analysis.

12. A system for identification of zones of high producibility in shale reservoirs, the system comprising a microprocessor cooperating with memory and a communication interface for:
receiving a Total Organic Carbon (TOC) content and an organic sulfur content of a formation interval obtained using geochemical measurements;
receiving a dielectric dispersion response of the formation interval determined using dielectric measurements;
processing the dielectric dispersion response to obtain a pore system tortuosity parameter; and
correlating the pore system tortuosity parameter with a ratio of the organic sulfur content to the TOC content to thereby identify presence of zones of mature kerogen with high or low hydrocarbon producibility, zones of immature kerogen with a presence of clay, and non-productive or over-mature zones within the formation interval by: comparing the ratio of the organic sulfur content to the TOC to an organic matter maturity threshold, and comparing the pore system tortuosity parameter to a pore system tortuosity parameter threshold.

13. The system of claim 12, wherein:
the microprocessor correlates the pore system tortuosity parameter with the ratio of the organic sulfur content to the TOC content by determining whether:
the ratio of the organic sulfur content to the TOC is greater than an organic matter maturity threshold and the pore system tortuosity parameter is greater than a pore system tortuosity parameter threshold, indicative of a zone of mature kerogen with high hydrocarbon producibility;
the ratio of the organic sulfur content to the TOC is greater than the organic matter maturity threshold and the pore system tortuosity parameter is less than the pore system tortuosity parameter threshold, indicative of a zone of mature kerogen with low hydrocarbon producibility;
the ratio is less than the organic matter maturity threshold and the pore system tortuosity parameter is greater than the pore system tortuosity parameter threshold, indicative of a zone of immature kerogen with a presence of clay; and
the ratio is less than the organic matter maturity threshold and the pore system tortuosity parameter is less than the pore system tortuosity parameter threshold, indicative of a non-productive of over-mature kerogen zone.

14. The system of claim 12, wherein the microprocessor obtains the pore system tortuosity parameter by processing the dielectric dispersion response to obtain a dielectric dispersion slope for the formation interval.

15. The system of claim 12, wherein the microprocessor obtains the pore system tortuosity parameter by processing the dielectric dispersion response to obtain a pore tortuosity index for the formation interval.

16. The system of claim 15, wherein the microprocessor obtains the pore tortuosity index from the dielectric dispersion response using effective medium theory.

17. The system of claim 16, wherein the effective medium theory is mathematically represented as:

$$\varepsilon_{\textit{eff}} = \varnothing_w^{m^*} \varepsilon_w + (1 - \varnothing_w^{m^*}) \varepsilon_m - \varepsilon_m h(s)$$

where m* represents the pore tortuosity index, $\varepsilon_m$ represents matrix permittivity of the formation interval, $\varepsilon_w$ represents water permittivity of the formation interval, $\emptyset_w$ represents water-filled porosity of the formation interval, s is the ratio $\varepsilon_m/(\varepsilon_w-\varepsilon_m)$, and h(s) is computed numerically.

18. A method for identification of zones of high producibility in organic-rich source rock associated reservoirs, the method comprising:
- obtaining a Total Organic Carbon (TOC) content and an organic sulfur content of a formation interval using geochemical measurements;
- determining a dielectric dispersion response of the formation interval using dielectric measurements;
- processing the dielectric dispersion response to obtain a pore system tortuosity parameter; and
- correlating the pore system tortuosity parameter with a ratio of the organic sulfur content to the TOC content by comparing the ratio of the organic sulfur content to the TOC to an organic matter maturity threshold, comparing the pore system tortuosity parameter to a pore system tortuosity parameter threshold, and determining the zones of high producibility in the formation interval based upon the comparisons.

19. The method of claim 18, wherein the zones of high producibility of the formation interval are determined where the ratio of the organic sulfur content to the TOC is greater than an organic matter maturity threshold and the pore system tortuosity parameter is greater than a pore system tortuosity parameter threshold, indicative of a zone of mature kerogen with high producibility.

20. The method of claim 18,
- wherein the pore system tortuosity parameter is obtained by processing the dielectric dispersion response to obtain a dielectric dispersion slope for the formation interval;
- wherein the dielectric dispersion response is determined by measuring a first dielectric constant of the formation interval at first frequency at which a dielectric constant of the formation interval is dominated by interfacial polarization, and measuring a second dielectric constant of the formation interval at a second frequency at which a dielectric constant of the formation interval is dominated by dominated by dipolar polarization; and
- wherein the dielectric dispersion response is processed to obtain the dielectric dispersion slope by diving a difference between the second dielectric constant and the first dielectric constant by a difference between the second frequency and the first frequency.

21. The method of claim 18, wherein the pore system tortuosity parameter is obtained by processing the dielectric dispersion response to obtain a pore tortuosity index for the formation interval, wherein the pore tortuosity index is obtained from the dielectric dispersion response using effective medium theory, the effective medium theory being mathematically represented as:

$$\varepsilon_{\mathit{eff}} = \emptyset_w^{m^*} \varepsilon_w + \left(1 - \emptyset_w^{m^*}\right)\varepsilon_m - \varepsilon_m h(s)$$

where m* represents the pore tortuosity index, $\varepsilon_m$ represents matrix permittivity of the formation interval, $\varepsilon_w$ represents water permittivity of the formation interval, $\emptyset_w$ represents water-filled porosity of the formation interval, s is the ratio $\varepsilon_m/(\varepsilon_w-\varepsilon_m)$, and h(s) is computed numerically.

* * * * *